United States Patent [19]

Taguchi et al.

[11] 3,949,412

[45] Apr. 6, 1976

[54] CAMERA WITH AN EXPOSURE INDICATING AND CONTROL DEVICE

[75] Inventors: Tetsuya Taguchi, Kawasaki; Mutsunobu Yazaki; Noriaki Sanada, both of Yokohama, all of Japan

[73] Assignee: Canon Kabushiki Kaisha, Japan

[22] Filed: Dec. 4, 1974

[21] Appl. No.: 529,532

[30] Foreign Application Priority Data

| Dec. 6, 1973 | Japan | 48-138374 |
| Sept. 26, 1974 | Japan | 49-111300 |
| Sept. 26, 1974 | Japan | 49-111301 |

[52] U.S. Cl. ............... 354/23 R; 354/48; 354/51; 354/60 E; 356/226
[51] Int. Cl.²... G03B 7/08; G01J 1/44; G03B 17/18
[58] Field of Search ......... 354/23, 48, 50, 51, 60 R, 354/60 EI, 60 L; 356/213, 215, 218, 226, 227

[56] References Cited
UNITED STATES PATENTS

| 3,547,018 | 12/1970 | Hakenbe | 354/60 EI X |
| 3,661,062 | 5/1972 | Wirst | 354/60 L |
| 3,698,302 | 10/1972 | Sato | 354/60 R X |
| 3,699,857 | 10/1972 | Wagner et al. | 354/60 L |
| 3,812,503 | 5/1974 | Engelsman et al. | 354/60 L |

*Primary Examiner*—Joseph F. Peters, Jr.
*Attorney, Agent, or Firm*—McGlew and Tuttle

[57] ABSTRACT

A camera is provided, in which the light sensitive element for the electronic exposure meter can be commonly used as the light sensitive element for the exposure control circuit.

9 Claims, 3 Drawing Figures

CAMERA WITH AN EXPOSURE INDICATING AND CONTROL DEVICE

BACKGROUND OF THE INVENTION

1. Field of the Invention

The present invention relates to improvements of a camera with an exposure device, especially to a camera in which the light sensitive element for the electronic exposure meter is also used for the exposure control device for controlling the shutter speed.

2. Description of the Prior Art

Devices for controlling the electronic exposure meter and the exposure control device by means of a common light sensitive element have been known to us from U.S. Pat. Nos. 3,699,857 and 3,661,062. However, in the case of the device according to U.S. Pat. No. 3,699,857, a switching over switch is needed for connecting the light sensitive element either with the electronic exposure meter or with the exposure control device while in the case of the device according to U.S. Pat. No. 3,661,062 a switch similar to the above mentioned switch is also needed. Namely in the case of the device according to U.S. Pat. No. 3,661,062 the light sensitive element is always connected with the input terminal of the electronic exposure meter and that of the exposure control device whereby, in order to eliminate the disadvantageous influence on the exposure meter in controlling the exposure, a switch disconnecting the electronic exposure meter from the current source is needed. In consequence not only misoperation due to chattering or the like by means of the of the switching over switch is increased but also it is difficult to construct the device with integrated circuits because the switching over switch is a mechanical one.

SUMMARY OF THE PRESENT INVENTION

A purpose of the present invention is to provide a camera free from the shortcomings and chattering of the conventional cameras, in which the light sensitive element for the electronic exposure meter can be commonly used as the light sensitive element for the exposure control circuit.

Another purpose of the present invention is to provide a camera easily constructed with an integrated circuit, in which the light sensitive element for the electronic exposure meter can be commonly used as the light sensitive element for the exposure control circuit.

A further purpose of the present invention is to provide a camera in which the light sensitive element for the electronic exposure meter is used also as the light sensitive element for the exposure control circuit, whereby the electronic exposure meter is able to indicate the termination of the shutter operation.

Further purposes of the present invention will be disclosed according to the detailed explanations made below with respect to the accompanying drawings.

BRIEF DESCRIPTION OF THE DRAWINGS

The detailed operation of the preferred embodiments of this invention will be described more completely with reference to the accompanying drawings in which.

DESCRIPTION OF THE PRESENT EMBODIMENTS

Figure 1:
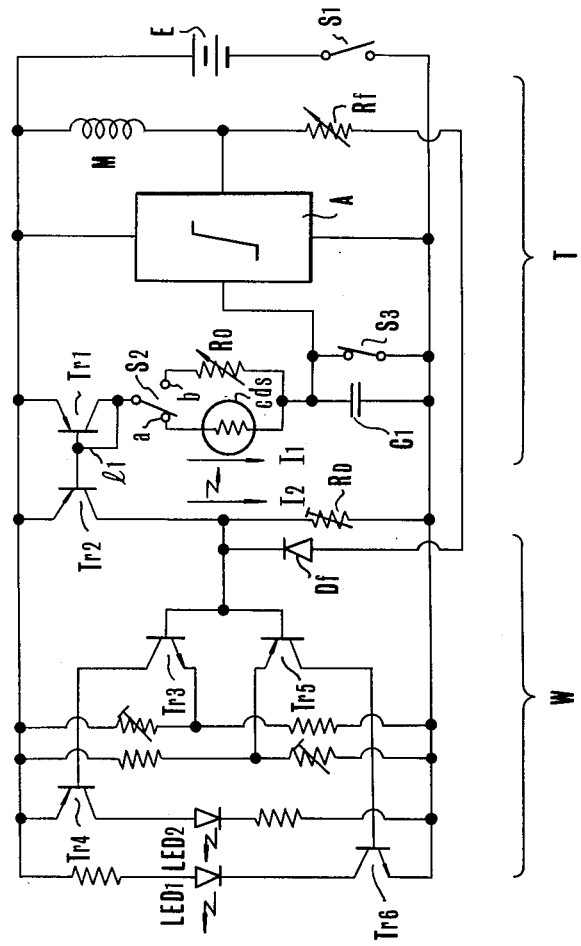
FIG. 1 is a schematic circuit diagram of an embodiment of the exposure control device, according to the present invention, for a camera.

In FIG. 1, the part T is the shutter speed control circuit for controlling the shutter speed of a camera, while the part W is the exposure alarm circuit. The shutter speed control circuit T consists of a battery E, the main current switch $S_1$, a transistor $Tr_1$ with its base and collector connected with each other by means of the conductor $l_1$ so as to present a diode characteristic, a switching over switch $S_2$ for setting the flash photographing mode, the manual shutter speed adjusting photographing mode or the automatic exposure photographing mode, a light receiving element CdS such as for example CdS, CdSe or the like for receiving the light from the object, a variable resistance Ro for setting flash photographing or manual shutter speed adjusting photographing, the timing condenser $C_1$, a short circuit switch $S_3$ connected in parallel with the condenser $C_1$ so as to be opened in functional coordination with the opening of the shutter and to be closed in functional coordination with the winding up of the shutter, a switching circuit A, for example a Schmitt circuit or the like, presenting an input terminal connected with the condensor C as the output terminal of the timing circuit, an electromagnet M for holding the shutter closing mechanism, connected with the output of the switching circuit A, and a feed back resistance Rf. The resistance value of the variable resistance Ro is so adjusted that the time constant of resistance Ro and condensor $C_1$ is manually set for a certain determined shutter speed, respectively for a shutter speed for example 1/30 second suitable for the flash photographing, when the switch $S_2$ is switched over to the side b.

The alarm circuit W has as the input, a transistor $Tr_2$ with its base connected with the base of the transistor $Tr_1$. $R_D$ is a voltage dividing resistance connected with the collector of the transistor $Tr_2$, $Tr_3$, $Tr_4$, $Tr_5$ and $Tr_6$ are transistors constituting a switching circuit, $LED_1$ an illumination diode connected with the collector of the transistor $Tr_6$ for indicating under exposure, $LED_2$ an illumination diode connected with the collector of the transistor $Tr_4$ for indicating excessive exposure and Df a feed back circuit diode connected with the output of the switching circuit A through the resistance Rf.

The operation of the device so constituted as mentioned above will now be explained. In the case of automatic exposure photographing, the switch $S_2$ is connected with the side a, the switch $S_1$ is closed and the camera is directed toward the object to be photographed. Thus, the light receiving element CdS assumes a resistance value corresponding to the brightness of the object to be photographed. Because a closed circuit consisting of the current source E, the transistor $Tr_1$, the switch $S_1$, Cds element, short circuit switch $S_3$, and switch $S_1$ is formed, the current flowing between the emitter and the base of the transistor Tr assumes a current value corresponding to the resistance of the CdS element, namely a value corresponding to the brightness of the object to be photographed. Because, on the other hand, the base of the transistor $Tr_2$ is connected with the base of the transistor $Tr_1$, the base of the transistor $Tr_2$ has applied thereto a voltage corresponding to the logarithmically compressed brightness of the object to be photographed. Therefore, the collector current of the transistor $Tr_2$ assumes a prolonged current value $I_2$. Thus the current $I_2$ is a current proportional to the brightness of the object to be photographed ($I_2 = kI_1$).

Thus a current corresponding to the brightness of the object flows through the voltage dividing resistance $R_D$ so that, to the base of the transistors $Tr_3$ and $Tr_5$, a voltage corresponding to the brightness of the object to be photographed is applied. On the other hand, the output of the switching circuit A is in a position to supply a current for holding the electromagnet M. Consequently, the rear part of the focal plane shutter remains held. Further, the potential at the one end of the resistance $Rf$ is zero and the diode $Df$ is inversely biased, so that no bias voltage, namely no feed back voltage, is supplied to the base of the transistors $Tr_3$ and $Tr_5$ by means of the diode $Df$. In consequence, either the transistor $Tr_3$ or the transistor $Tr_5$ is brought into a conductive state, depending upon the value of the voltage being generated between opposite ends of the resistance $R_D$.

Namely, in case the brightness of the object to be photographed is more than a certain determined value, the voltage at the bases of the transistors $Tr_3$ and $Tr_5$ is high enough to bring the transistor $Tr_3$ into a conductive state so that the illumination diode $LED_2$ is lit up by means of the transistor $Tr_4$. Thus, the over exposure alarm is given to the photographer. In this case, a proper exposure for taking photograph can be obtained by adjusting the opening of the diaphragm device, not shown in the drawing, provided for example in front of the $CdS$ element and variable in functional coordination with the diaphragm value, until the diode $LED_2$ fades out. In case the brightness of the object to be photographed is below a certain determined value, the transistor $Tr_5$ is brought into a conductive state and the diode $LED_1$ is lit up so as to give an alarm to the photographer.

The exposure control operation will now be explained, whereby it is supposed that the brightness of the object to is photographed be higher than the determined value. In, consequence in this case, the illumination diode $LED_2$ lights up as mentioned above. When the release button, not shown in the drawing, is depressed for taking a photograph the front part of the focal plane shutter starts to run while the switch $S_3$ is opened in such a manner that the electric current $I_1$ is gradually reduced. In consequence the electric current $I_2$ is also reduced gradually. The condenser $C_1$ is charged, whereby, when the value of the electric current $I_2$ is reduced below a certain determined value, the transistor $Tr_3$ is brought into a switched off state so that the illumination diode $LED_1$ for indicating high brightness fades out. However, the illumination diode $LED_1$ for indicating low brightness does not light up yet. The condenser $C_1$ is further charged and when the value of the electric current $I_2$ is reduced below another certain determined value, the transistor $Tr_5$ is brought into a switched on state so that the illumination diode $LED_1$ lights up. When then the charging voltage of the condenser $C_1$ reaches a certain determined value the output state of the switching circuit A is inversed in such a manner that the driving current for the electromagnet M is interrupted so that the rear part of the focal plane shutter starts to run so as to terminate the exposure. At the same time, the terminal voltage of the resistance $Rf$ is increased nearly up to the terminal voltage of the current source E. In consequence the base voltage of the transistors $Tr_3$ and $Tr_5$ is increased in such a manner that the transistor $Tr_5$ in the switched on state is again brought into the switched off state so that the illumination diode $LED_1$ fades out. Hereby the base potential of the transistors $Tr_3$ and $Tr_5$, when the magnet M is in the non-excited state, has been adjusted by means of the variable resistance $Rf$ in such a manner that the transistor $Tr_3$ is in the switched on state, while the transistor $Tr_5$ is in the switched off state. As mentioned above, according to the present invention, in case the brightness of the object to be photographed is high the illumination diode $LED_2$ at first lights up so as to indicate that the brightness of the object to be photographed is high, then, during the charging process of the condenser the illumination diode $LED_1$ for low brightness lights up so as to indicate that the condenser $C_1$ is being charged and further, at the termination of the exposure by means of the feed back circuit consisting of the resistance $Rf$ and the diode $Df$, the illumination diode $LED_1$ for low brightness is again made to fade out so as to indicate to the photographer that the exposure operation has been terminated. In consequence, according to the present invention the light sensitive element can commonly be used for the electronic exposure meter as well as for the exposure control device without using any mechanical switch, whereby further the termination of the exposure operation can also be indicated clearly. In case the brightness of the object to be photographed is moderate and the photograph is taken with the proper exposure neither illumination diode $LED_1$ and $LED_2$ lights up, during the charging process of the timing condenser $C_1$ only the illumination diode $LED_1$ lights up as mentioned above so as to indicate that the condenser $C_1$ is being charged and further at the termination of the exposure process the illumination diode $LED_1$ again fades out so as to indicate to the photographer that the exposure process has been terminated. In case the brightness of the object to be photographed is low, only the illumination diode $LED_1$ for indicating low brightness lights up so as to indicate to the photographer that it is necessary to hold the camera firmly during taking of the photograph, during the charging process of the timing condenser $C_1$ only the illumination diode $LED_1$ continues to light as mentioned above so as to indicate that the condenser $C_1$ is being charged and further at the termination of the exposure process the illumination diode $LED_1$ fades out as mentioned above so as to indicate to the photographer that the exposure process has been terminated.

Below another embodiment of the present invention will be explained according to FIG. 2, whereby the same elements as those in FIG. 1 present the same reference figures.

Figure 2:
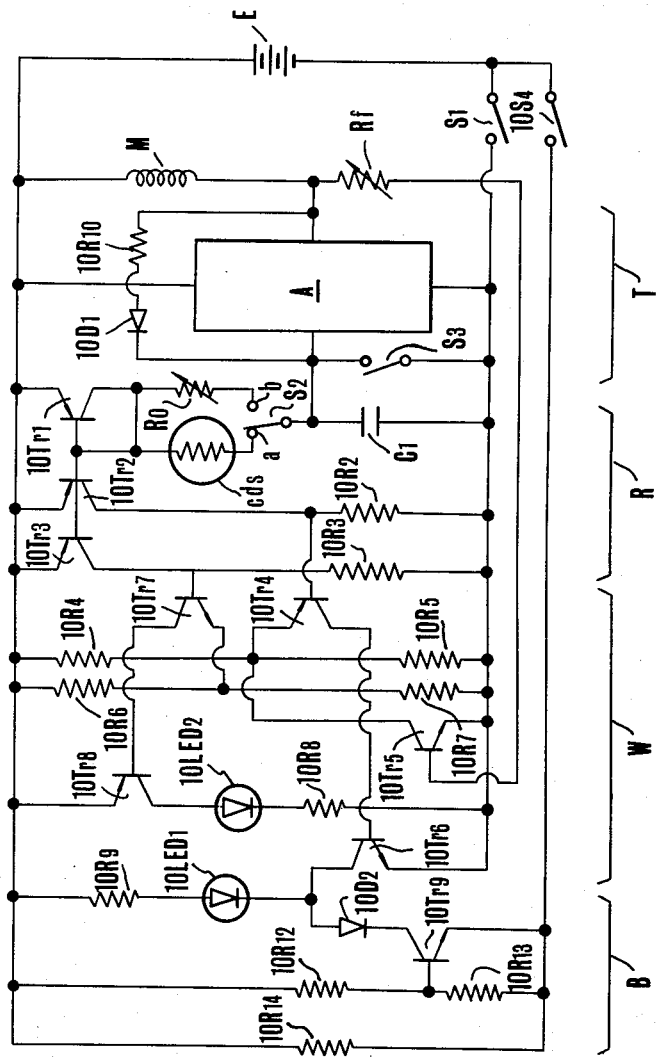
FIG. 2 is a schematic circuit diagram of another embodiment of the exposure control device, according to the present invention, for a camera.

In FIG. 2, the part T is the shutter speed control circuit for controlling the shutter time of the camera, the part R the electric current regenerating circuit for regenerating the electric current flowing through the light receiving element so as to supply the exposure alarm circuit to be explained later with the information signal of the object to be photographed, the part W the exposure alarm circuit for indicating whether the brightness of the object to be photographed is suitable for obtaining the proper exposure, and the part B the battery checker circuit. Hereby the shutter speed control circuit T is composed as follows. $10R_{10}$ is a resistance while $10D_1$ is a diode connected in series with the resistance $10R_{10}$, and the resistance $10R_{10}$ and the diode $10D_1$ are connected between the input and the output of the switching circuit A so as to constitute a feed back circuit. The feed back circuit consisting of the above mentioned resistance $10R_{10}$ and the above mentioned diode $10D_1$ is the circuit for charging the condenser $C_1$ up to a sufficiently high potential by applying the voltage of the current source to the condenser $C_1$ at the moment when the current flowing through the electromagnet M is interrupted, in the case when the current flowing through the electromagnet M is interrupted, namely at the termination of the exposure process, the condenser $C_1$ has not been charged up to a sufficient potentional in such a manner that the switching circuit A can not be held in a complete state. In other words, the circuit is a safety circuit. The current regenerating circuit R consists of the transistors $10Tr_2$ and $10Tr_1$ connected with the base of the transistor $10Tr_3$ and the resistances $10R_2$ and $10R_3$. The alarm circuit W has the output of the transistors $10Tr_2$ and $10Tr_3$ as its input. $10Tr_4$, $10Tr_6$, $10Tr_7$ and $10Tr_8$ are the transistors constituting the switching circuit, $10LED_1$ is the illumination diode connected with the collector of the transistor $10Tr_6$ for indicating the under exposure while $10LED_2$ is the illumination diode connected with the collector of the transistor $10Tr_8$ for indicating the over exposure and $10Tr_5$ is the transistor for the feed back circuit, connected with the output of the switching circuit A through the resistance $Rf$. The battery checker circuit B consists of the resistance $10R_{14}$, the resistances $10R_{12}$ and $10R_{13}$ for applying the divided voltage of the current source to the base of the transistor $10Tr_9$, the diode $10D_2$ and the checker switch $10S_4$.

When a photograph is taken with the automatic exposure by means of the above mentioned circuit, the switch $S_2$ is connected with the side a, the switch $S_1$ is closed and the camera is directed toward the object to be photographed. Thus, the light receiving element CdS assumes a resistance value corresponding to the brightness of the object to be photographed. Further, a closed circuit consisting of the current source E, the transistor $10Tr_1$, the CdS element, the short circuit switch $S_3$ and the switch $S_1$ is formed. The current flowing through the emitter and the base of the transistor $10Tr_1$ assumes a current value corresponding to the resistance of the CdS element, namely to the brightness of the object to be photographed. On the other hand, the emitter-collector current $I_2$ of the transistor $10Tr_2$ assumes a current value proportional to the brightness of the object to be photographed as already explained for the operation of the first embodiment ($I_2 = KI_1$). In consequence, a current corresponding to the brightness of the object to be photographed flows through the voltage dividing resistances $10R_2$ and $10R_3$ in such a manner that the bases of the transistors $10Tr_7$ and $10Tr_4$ have applied thereto the voltage corresponding to the brightness of the object to be photographed. On the other hand, the output of the switching circuit A is in a position to supply a current for holding the electromagnet M and the rear part of the focal plane shutter is held so that the potential of the one end of the resistance $Rf$ is zero. In consequence the transistor $10Tr_5$ is in the switched off state and no feed back signal is applied to the emitter of the transistor $10Tr_4$. In consequence, either the transistor $10Tr_4$ or the transistor $10Tr_7$ is brought into the conductive state depending upon the value of the voltage generated in the resistances $10R_2$ and $10R_3$.

Namely, when the brightness of the object to be photographed is higher than the determined value, the base voltage of the transistors $10Tr_4$ and $10Tr_7$ becomes high so that the transistor $10Tr_7$ is brought into the conductive state. Thus, the illumination diode $10LED_2$ lights up by means of the transistor $10Tr_8$ so as to indicate the over exposure. In such case, the opening of the diaphragm device variable in functional with the diaphragm value provided in front of, for example, the CdS element is adjusted until the illumination diode $10LED_2$ fades out in order to obtain a proper exposure.

In case, on the other hand, the brightness of the object to be photograhed is lower than the determined value, the transistor $10Tr_4$ is brought into the conductive state in such a manner that the illumination diode $10LED_1$ lights up.

When then the front part of the focal plane shutter starts to run by releasing the shutter, the switch $S_3$ is opened and the condenser $C_1$ starts to be charged.

On the other hand, the rear part of the focal plane shutter is held by means of the above mentioned electromagnet M, whereby, when the condenser $C_1$ has been charged after a certain determined time, the current for driving the electromagnet is interrupted by the inversion of the switching circuit A in such a manner that the terminal voltage of the resistance $Rf$ is increased. In consequence, the base voltage of the transistor $10Tr_5$ is inversed in such a manner that the transistor $10Tr_5$ is brought into the switched on state so that the potential at the emitter of the transistor $Tr_4$ is nearly zero, bringing the transistors $10Tr_4$ and $10Tr_6$ into the switched off state and the illumination diode $10LED_1$ fades out so as to indicate to the photographer that the photograph has been taken.

Further, the voltage checking of the current source is carried out as follows.

At first, the switch $10S_4$ for checking voltage is closed. When the voltage of the current source E is higher than the determined value, the transistor $10Tr_9$ is brought into the conductive state in such a manner that the illumination diode $10LED_1$ lights up, which indicates that the voltage of the current source E is higher than the determined value. It goes without saying that, in case the voltage of the current source E is lower than the determined value, no current flows through the illumination diode $10LED_1$, which does not light up, thus indicating the state of the voltage of the current source to the photographer.

Figure 3:
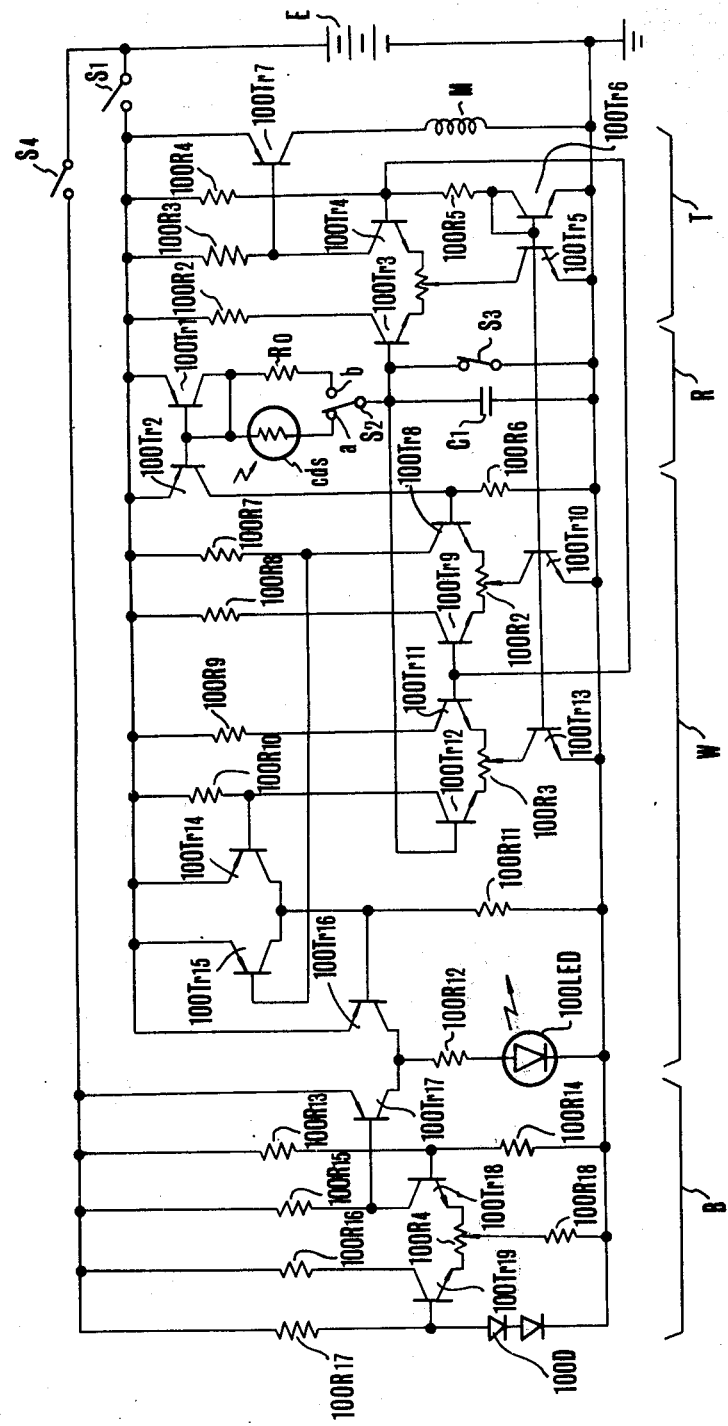
FIG. 3 is a schematic circuit diagram of a further embodiment of the exposure control device, according to the present invention, for a camera.

FIG. 3 shows the circuit diagram of a further another embodiment of the exposure control device according to the present invention, whereby the same elements as those in the above mentioned embodiments present the same reference figures. $100Tr_3$ is a transistor with its base connected with the output terminal of the timing circuit and $100Tr_4$ is a transistor connected with the constant voltage circuit consisting of a transistor $100Tr_6$ with its base connected with the resistances $100R_4$ and $100R_5$ in a diode connection, whereby a switching circuit is formed with the above mentioned transistors $100Tr_3$ and $100Tr_4$. The above mentioned switching circuit is so constituted that the transistor $100Tr_4$ is brought into the switched off state when the condensor $C_1$ has been charged up to the determined voltage. $100Tr_7$ is a transistor with is base connected with the collector of the transistor $100Tr_4$, while the electromagnet M for controlling the rear part not shown in the drawing, of the focal plane shutter is connected with the collector of the transistor $100Tr_7$.

The current regenerating circuit R consists of the transistor $100Tr_2$, with its base connected with the base of the transistor $100Tr_1$ in a diode connection and of the resistance $100R_6$. The part W is the alarm circuit, in which the switching circuit for the indicating means 100LED is formed by the transistor $100Tr_8$ with its base connected with the collector of the transistor $100Tr_2$, the transistor $100Tr_9$ with its base connected with the above mentioned constant voltage circuit, the transistor $100Tr_{10}$, the resistances $100R_2$, $100R_7$, $100R_8$, the transistor $100Tr_{11}$ with its base connected with the above mentioned constant voltage circuit, the transistor $100Tr_{12}$ with its base connected with the output of the timing circuit, the transistor $100Tr_{13}$, the resistances $100R_3$, $100R_9$, $100R_{10}$, the transistor $100Tr_{14}$, the transistor $100Tr_{15}$ with its base connected with the collector of the transistor $100Tr_8$, the transistor, $100Tr_{15}$ and the resistance $100R_{11}$. The above mentioned switching circuit is so constituted that, when the brightness of the object to be photographed is low, the transistor $100Tr_{16}$ is brought into the switched on state and the indication means 100LED lights up through the resistance $100R_{12}$, while, when the timing condenser $C_1$ has been charged up to the determined voltage, the transistor $100Tr_{16}$ is brought into the switched off state and the indication means 100LED fades out.

The part B is the battery checker, in which $100R_{17}$ is a resistance and 100D a diode whereby a constant voltage circuit is formed by these two elements. This constant voltage circuit supplies the base of the transistor $100Tr_{19}$ with a constant voltage. $100R_{13}$ and $100R_{14}$ are resistances constituting a voltage dividing circuit serving to supply the base of the transistor $100Tr_{18}$ with the divided voltage of the current source E.

Transistors $100Tr_{18}$, $100Tr_{19}$ form a comparator together with the resistances $100R_{15}$, $100R_{16}$, $100R_{18}$. The operation of this comparator is as follows. When the voltage of the current source E is higher than the determined value the transistor $100Tr_{18}$ is brought into the switched on state in such a manner that the indication means 100LED lights up by means of the transistors $100Tr_{17}$.

Below the operation of the camera shown in FIG. 3 is explained. In case the photograph is taken with the automatic exposure, the switch $S_2$ is connected with the side a, the switch $S_1$ is closed and the camera is directed toward the object to be photographed. Thus the light receiving element CdS assumes the resistance value corresponding to the brightness of the object to be photographed. Further, a closed circuit is formed with the current source E, the switch $S_1$, the transistor $100Tr_1$, the light receiving element CdS and the short circuit switch $S_3$, whereby the current flowing between the emitter and the base of the transistor $100Tr_1$, assumes the value corresponding to the brightness of the object to be photograhed, because the resistance of the light receiving element assumes the value corresonding to the brightness of the object to be photographed. On the other hand, the collector current $I_2$ of the transistor $100Tr_2$ assumes the value proportional to the brightness of the object to be photographed, as in the embodiments of FIGS. 1 and 2 ($I_2 = KI_1$).

As the result the current corresponding to the brightness of the object to be photographed flows through the resistance $100R_6$. In case the object to be photographed is too dark, in other words, a longer shutter time is needed in order to obtain the proper exposure, the base potential of the transistor $100Tr_8$ is low because the current flowing through the resistance $100R_6$ is small. On the other hand to the base of the transistor $100Tr_9$ there is applied a certain determined standard potential from the constant voltage circuit consisting of the resistances $100R_4$, $100R_5$ and the transistor $100Tr_6$. In consequence the base potential of the transistor $100Tr_8$ is lower than the above mentioned standard potential, and the transistor $100Tr_8$ is brought into the switch off state so that the transistor $100Tr_{15}$ is also brought into the switched off state. On the other hand, the base of the transistor $100Tr_{12}$ is earthed by means of the switch $S_3$ so that the transistor is in the switched off state so that the transistor $100Tr_{16}$ is also brought into the switched off state. In consequence to the base of the transistor $100Tr_{16}$ there is applied a zero potential by means of the resistance $100R_{11}$ so that the transistor $100Tr_{18}$ is brought into the switched on state so that a current flows through the indication means 100LED which lights up so as to indicate that the brightness of the object to be photographed is low. When then the shutter is released so as to start the exposure and the count switch $S_3$ is opened in an already known way, the condenser $C_1$ starts to be charged by means of the light receiving element. When the condenser $C_1$ is charged up to the above mentioned standard potential, the transistors $100Tr_4$ and $100Tr_7$ are brought into the switched off state and the current flowing through the electromagnet M is interrupted whereby the electromagnet is brought out of operation so that the shutter member is controlled in an already known way so as to terminate the exposure. On the other hand the base potential of the transistor $100Tr_{12}$ is same as that of the condenser $C_1$ and therefore, after the shutter being released, gradually increased so as to reach the above mentioned standard potential at the same time when the transistors $100Tr_4$ and $100Tr_7$ are brought into the switched off state so as to terminate the exposure. Therefore the transistor $100Tr_{12}$ is brought into the switched on state at the same time with the termination of the exposure so that the transistor $100Tr_{14}$ is brought into the switched on state and a current flows through the resistance $100R_{11}$, whereby the base potential of the transistor $100Tr_{16}$ is increased and this transistor is brought into the switched off state. In consequence current no longer flows through the indication means 100LED which fades out so as to indicate to the photograher that the exposure has been terminated. In case the brightness of the object to be photographed is sufficient to obtain the proper exposure, the transistors $100Tr_8$ and $100T r_{15}$ are brought into the switched on state while the transistor $100Tr_{16}$ is brought into the switched off state so that the indication means 100LED does not light up from the very beginning. Thereby it goes without saying that, by pushing down the release button, the exposure operation is carried out similarly to the above mentioned case whereby the proper exposure can be obtained.

Because as explained above according to the present invention the light sensitive element for the exposure meter is used commonly as the light sensitive element of the exposure control circuit without using a mechanical switching means, it is possible to eliminate the misoperaton of the exposure control circuit or the exposure meter due to the chattering and further because the electrical regenerating circuit is adopted instead of the mechanical switching means it is easy to design the circuit as an integrated circuit so that not only the device can be made compact but also the manufacturing cost of the device can be remarkably reduced.

While specific embodiments of the invention have been shown and described in detail to illustrate the application of the principles of the invention, it will be understood that the invention may be embodied otherwise without departing from such principles.

What is claimed is:

1. A camera including an exposure control apparatus having a light sensitive means for generating a control signal comprising, in combination, a first transistor connected to said light sensitive means for compressing the output signal of said light sensitive means by means of a diode connection, said first transistor having a base electrode; a regenerating circuit comprising a second transistor with a base electrode connected with the base electrode of said first transistor for enlarging the output signal of said first transistor, said second transistor including an output terminal; and an indicating means connected to the output terminal of said second transistor and operable to indicate the exposure quantity in accordance with the output of said second transistor.

2. A camera according to claim 1, wherein said first transistor is a pnp-type transistor.

3. A camera according to claim 1, wherein said second transistor is a pnp-type transistor.

4. A camera according to claim 1, wherein said regenerating circuit comprises a bleeder resistor connected with said output terminal of said second transistor for applying the input voltage to said indicating means.

5. A camera according to claim 4, wherein said resistor is a variable resistor.

6. A camera according to claim 1, wherein said indicating means comprises a detecting means for detecting the output voltage of said regenerating circuit.

7. A camera according to claim 6, wherein said indicating means further comprises a luminous diode connected to the output terminal of said detecting means for indicating whether or not the exposure quantity is sufficient.

8. A camera including an exposure control apparatus having a light sensitive means for generating a control signal comprising, in combination, a first transistor connected to said light sensitive means and operable to compress the output signal of said light sensitive means by a diode connection, said first transistor having a base electrode; a regenerating circuit comprising a second transistor having a base electrode connected with the base electrode of said first transistor for enlarging the output signal of said first transistor, said second transistor having an output terminal; and indicating means connected to the output terminal of said second transistor for indicating the exposure quantity in accordance with the output of said second transistor; and a timing circuit including said light sensitive means, a shutter driving means, switching means for generating a shutter driving signal for activating said shutter driving means when the output voltage of said timing circuit attains a certain predetermined level, said switching means having an input terminal, and a feedback loop connected between the output terminal of said switching means and said indicating means.

9. A camera according to claim 8, wherein said feed back loop comprises a diode for allowing the exciting current to flow along a certain predetermined direction.

* * * * *